United States Patent [19]

Paddington

[11] 4,202,567

[45] May 13, 1980

[54] COUPLING INCLUDING A TUBULAR COUPLING MEMBER TO BE COUPLED TO A FLANGE

[75] Inventor: Arthur L. Paddington, Whitstable, England

[73] Assignee: David Brown-Vosper (Offshore) Limited, Portchester, England

[21] Appl. No.: 930,743

[22] Filed: Aug. 3, 1978

[30] Foreign Application Priority Data

Aug. 3, 1977 [GB] United Kingdom ............... 32635/77

[51] Int. Cl.² ............................................. F16L 23/00
[52] U.S. Cl. ...................................... 285/18; 285/81; 285/320; 285/364
[58] Field of Search .................. 285/18, 364, 320, 82, 285/81, 89

[56] References Cited

U.S. PATENT DOCUMENTS

| 2,951,274 | 9/1960 | Elsner | 285/320 X |
| 3,489,434 | 1/1970 | Haley | 285/27 X |
| 3,558,161 | 1/1971 | Bormioli | 285/320 X |
| 3,586,350 | 6/1971 | Ashton | 285/364 X |
| 3,695,635 | 10/1972 | Paddington | 285/320 X |
| 4,113,283 | 9/1978 | Curtis et al. | 285/364 X |

FOREIGN PATENT DOCUMENTS

| 1155913 | 6/1969 | United Kingdom | 285/320 |
| 1426172 | 2/1976 | United Kingdom | 285/18 |

*Primary Examiner*—Thomas F. Callaghan
*Attorney, Agent, or Firm*—Fleit & Jacobson

[57] ABSTRACT

A pipe coupling comprises a tubular member to be coupled to a flange, and a ring slidable on the tubular member carrying pivotable hooks which co-operate with cams on the tubular member to engage behind the flange as the ring is moved along the tubular member. A second ring is provided for locking the first ring in position after coupling of the pipes has taken place.

4 Claims, 8 Drawing Figures

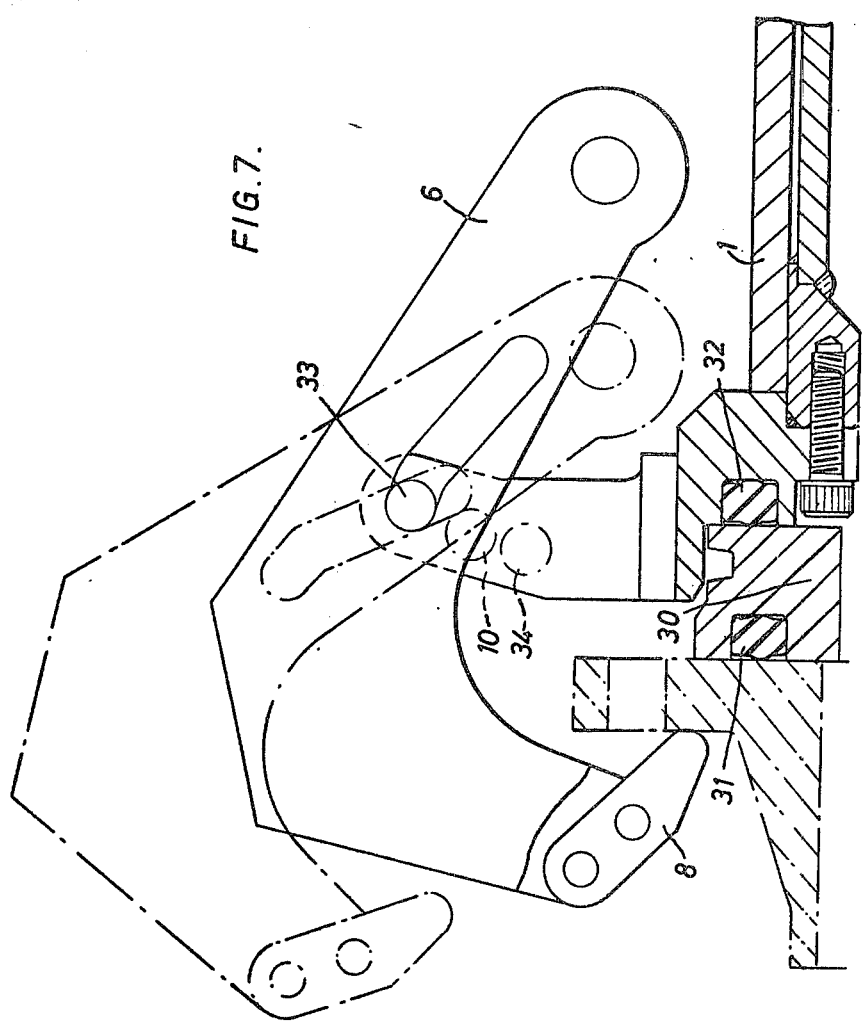

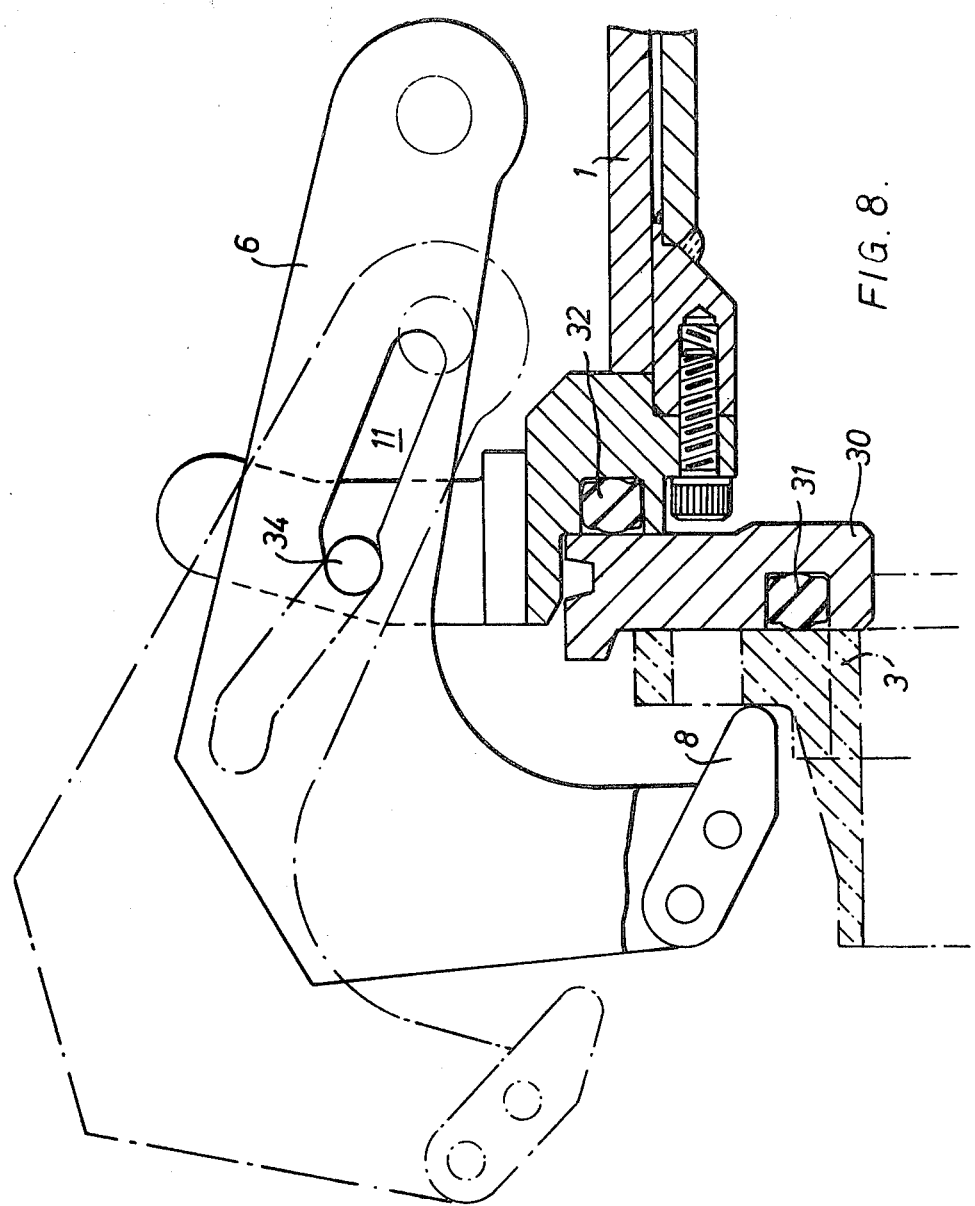

COUPLING INCLUDING A TUBULAR COUPLING MEMBER TO BE COUPLED TO A FLANGE

This invention relates to a coupling including a tubular coupling member to be coupled to a flange.

Such a coupling is suitable for use in securing the end of product transfer hose such as an oil hose carried by a tanker to a fixed installation such as an on-shore tank.

It is an object of this invention to provide an improved coupling including a tubular coupling member to be coupled to a flange.

According to this invention, there is provided a coupling comprising a tubular coupling member to be coupled to a flange and having a surface against which a flange can rest, a first ring slidable externally on the tubular coupling member, a plurality of hooks pivotably carried by the ring, co-operating cam surfaces formed on or carried by the tubular coupling member and the hooks, moving means for moving the first ring away from the said surface during which motion the action of the cam surfaces is to bring the hooks into positions in which they retain a flange resting against the said surface and urge the flange against the said surface, a second ring rotatable on said tubular coupling member, cam surfaces formed on or carried by said first and second rings and rotating means for rotating said second ring for bringing said cam surfaces formed on or carried by said first and second rings into cooperation to prevent motion of said first ring towards said surface, said second ring being rotatable to bring the cam surfaces formed on or carried by the first and second rings into cooperation only when said first ring is at the distance from said surface of said tubular coupling member in which the hooks are in engagement with a flange resting against said surface of said tubular coupling member.

Preferably, said moving means and said rotating means are hydraulically operated.

The provision of the second ring and the cam surfaces formed on or carried by the first and second rings ensures that should the hydraulic power fail those cam surfaces will retain the first ring in the position in which the hooks it carries will retain a flange resting against the said surface of the tubular coupling member.

Preferably, said moving means comprises at least one reversible hydraulic motor connected to a reversible hydraulic power source through two lines each of which can act as a flow or return path and one of which includes a first actuable hydraulic valve which when not actuated will only allow the flow of hydraulic fluid in the direction to move said first ring away from said surface of said coupling member and said rotating means comprises a reversible hydraulic motor coupled to said hydraulic source through two lines each of which can act as a flow or a return path and one of which includes a second actuable hydraulic valve which when not actuated only permits flow of hydraulic fluid to the rotating means in the direction to rotate it away from the position in which the cam surfaces formed on or carried by the first and second ring cooperate, said first hydraulic valve being arranged to be actuated directly or indirectly by said second ring when said second ring is rotated away from the position when the same surfaces formed on or carried by the first and second rings cooperate and said second hydraulic valve being positioned so as to be actuated directly or indirectly by the first ring when the first ring has been moved to the position away from the said surface of the tubular coupling member to the extent that the hooks will retain a flange in engagement with the said surface.

With the arrangement described in the preceding paragraph, in order to open or close the coupling it is merely necessary to reverse the direction of hydraulic flow.

Preferably, there are three hooks and the moving means comprise three hydraulic cylinder and pistons.

Preferably, the rotating means comprise a hydraulic cylinder and piston carried by arms extending from the tubular coupling member and the second ring.

A coupling in accordance with this invention will now be described, by way of example only, with reference to the accompanying drawings, in which.

Figure 6:
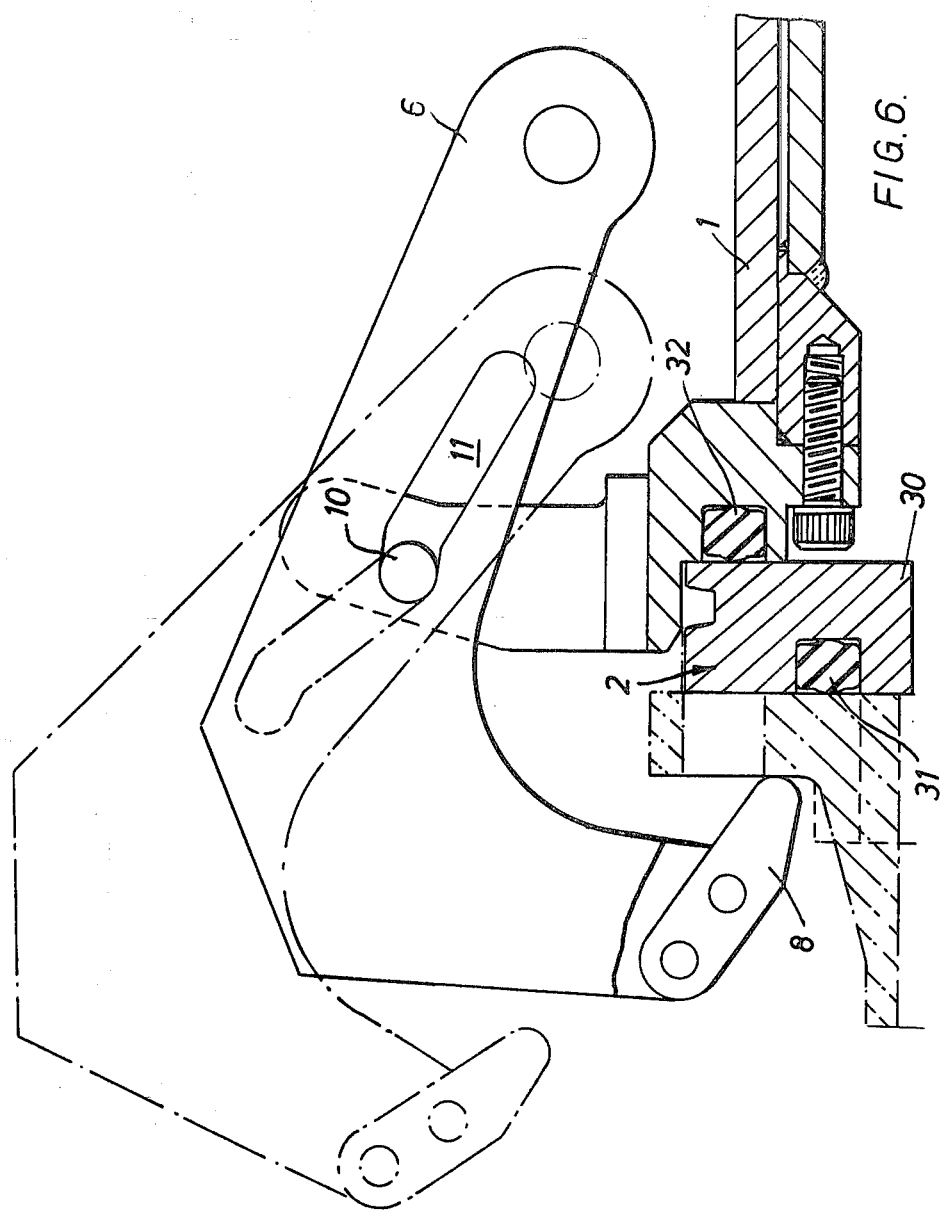
FIG. 6 is an enlarged fragmentary side sectional elevation of the coupling.

FIGS. 7 and 8 respectively show modifications of the arrangement shown in FIG. 6 for different sized flanges.

The coupling illustrated is intended to be carried at the end of a hose and is for securing that hose to a flange at the end of a manifold carried by the tanker.

The coupling includes a tubular member 1 (See FIGS. 1 to 3) formed at one end with a flange 2 intended to rest against the flange 3 of a tanker manifold 4. The purpose of the coupling is to secure the coupling member 1 to the manifold 4 and for this purpose to hold the flanges 2 and 3 in engagement with each other.

A ring 5 is slidable on the exterior of the coupling member 1 and has pivoted to it three hooks 6 equally spaced around the ring 5. Each hook 6 is in the form of a double plate 7 carrying a hook end 8 shown in FIGS. 1 and 2 in engagement with the rear surface of the flange 3.

A fixed ring 9 is secured to the exterior of the tubular coupling member 1 and rests against the flange 2 and carries three cam pins 10 each of which passes through aligned slots 11 in the plates 7 of the associated hook 6.

Three hydraulic cylinders 12 are carried by the ring 5 and their pistons 13 are secured to the fixed ring 9. The cylinders 12 are double acting and are fed in parallel. The ring 5 carries three plates 14 which extend in the direction away from the flange 2 and each of which is formed on its inner surface with an inclined cam surface 15 visible also in FIGS. 4 and 5.

A ring 16 is rotatable on the tubular coupling member 1 and is formed with three projecting cam plates 17 each of which has an inclined cam surface 18 intended to co-operate with one of the cam surfaces 15.

A cylinder 19 is carried by an arm 20 projecting from the tubular coupling member 1 and its piston 21 is secured to an arm 22 projecting from the ring 16.

Figure 1:
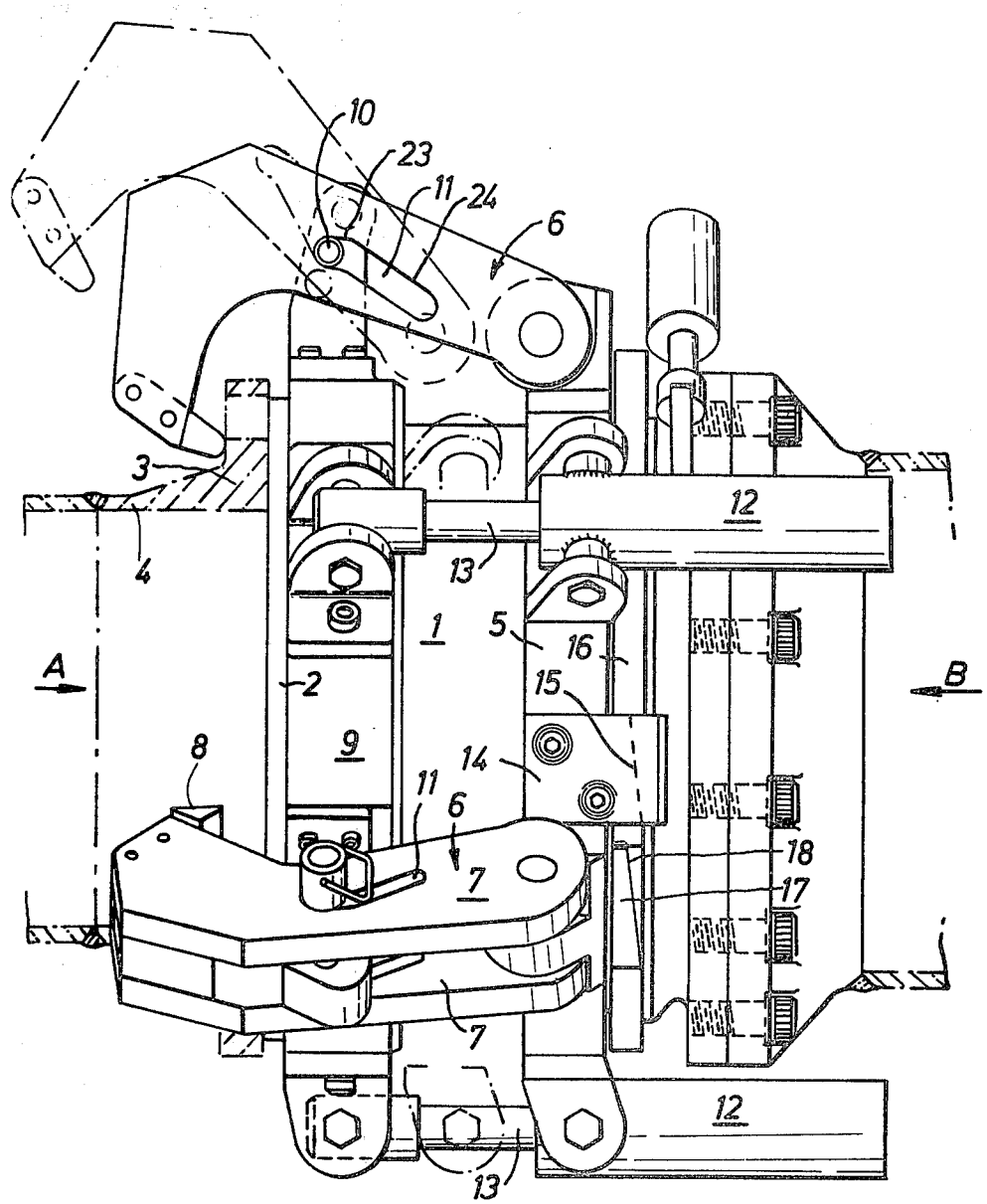
FIG. 1 is a side elevation of a coupling.
Figure 2:
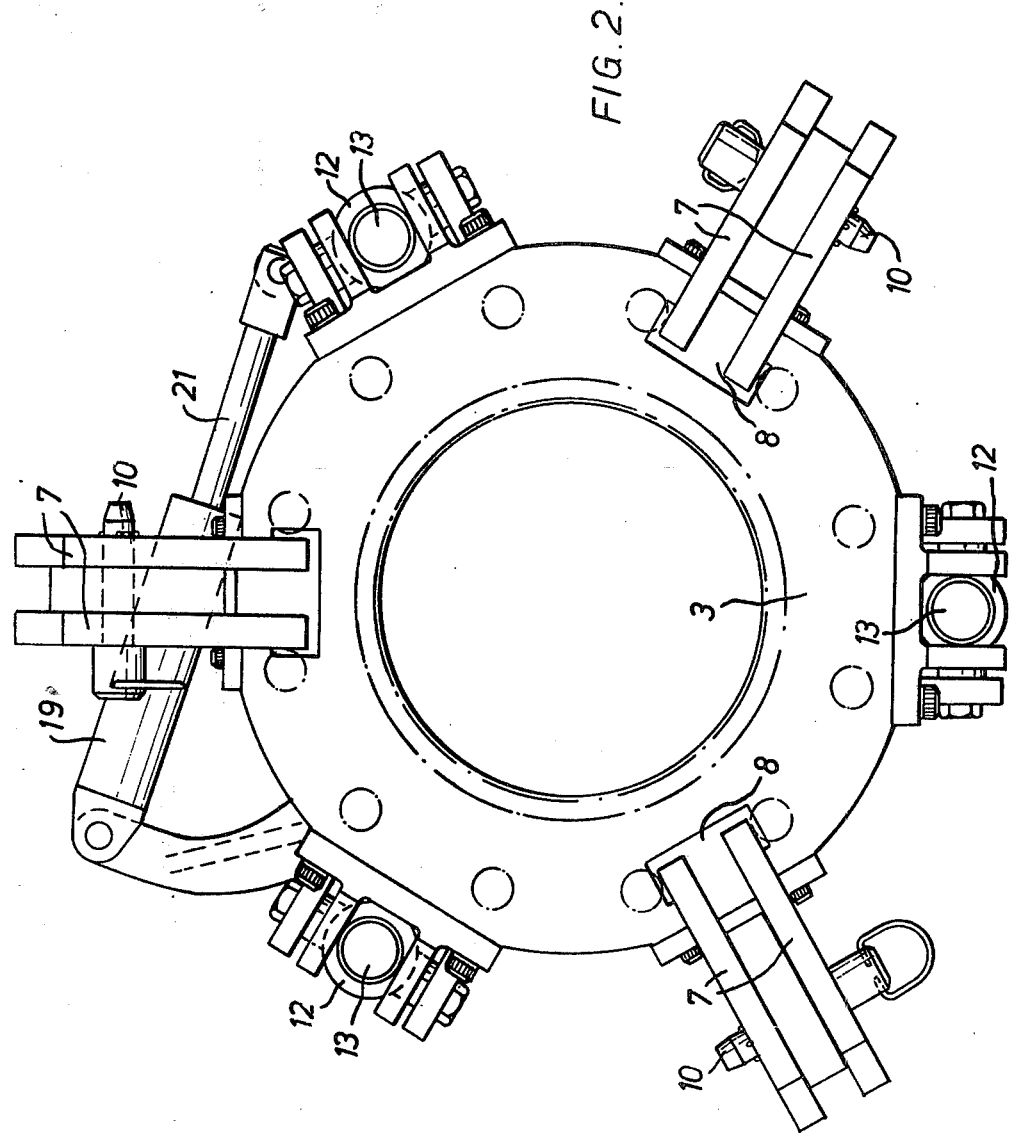
FIGS. 2 and 3 are, respectively, end elevations of a coupling in the directions of arrows A and B of FIG. 1.
Figure 3:
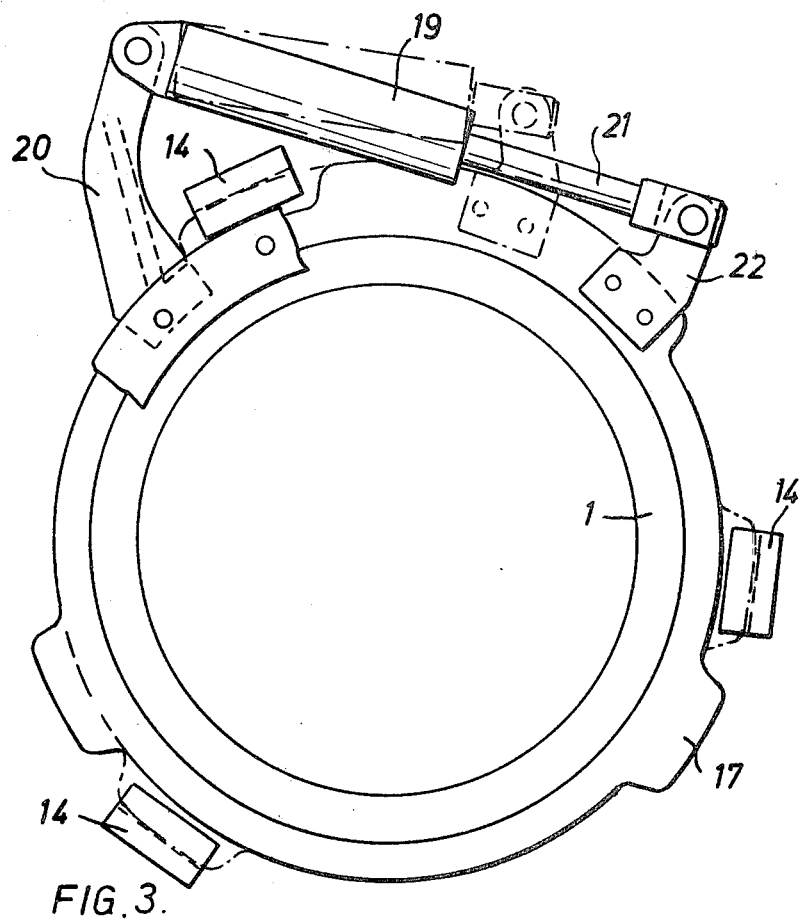

In order to open the coupling from the position shown in FIGS. 1 to 3, the ring 5 is moved to the left (as seen in FIG. 1) towards the flange 2 by appropriately supplying the cylinders 12 and during the initial motion of the ring 1, the hooks 6 do not pivot but are moved away from the flange 3, this initial motion of the hooks being due to the shape of the slots 11. Further motion of the ring 5 towards the flange 2 causes the hooks 6 to pivot outwardly, this outward movement again being caused by the shape of the slots 11. For this purpose, the slots 11 are essentially in two parts 23 and 24 at an angle to each other and as shown parts 23 are shorter than parts 24 although in certain embodiments the parts 23 may be extended to be equal in length to the parts 24.

When the ring 5 has been moved through its full motion when it will be adjacent to the ring 9, the hooks 6 are moved to the extent such that the hook ends 8 have been moved outwardly to the extent that axial movement of the coupling member 1 away from the manifold 4 is possible without the hook ends 8 engaging the flange 3.

When the flange 2 is in engagement with the flange 3, but the hooks 6 are in their outer position with the ring 5 adjacent to the ring 9, the hooks 6 can be brought into engagement with the flange 3 by moving the ring 5 to the right, that is away from the flange 2 by suitably supplying hydraulic fluid to the cylinders 12.

When the ring 5 is in the position shown and the hook ends 8 engage the flange 3, the cylinder 19 is supplied with hydraulic fluid in the direction to rotate the ring 16 in the anticlockwise direction as seen in FIG. 3 and this brings the cam surfaces 18 into engagement with the cam surfaces 15, and prevents motion of the ring 5 towards the flange 2, that is to say prevents the coupling being opened. The mechanical interlock provided by the co-operating cam surfaces 15 and 18 will thus prevent the coupling opening in the event that the hydraulic supply fails.

Figure 4:
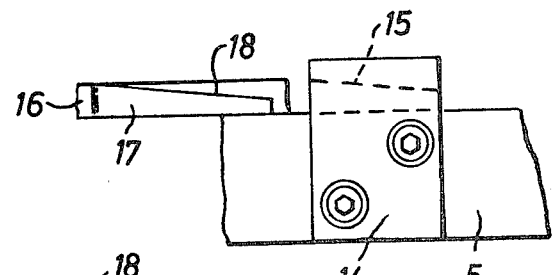
FIGS. 4 and 5 show the two possible positions of cam surfaces of the coupling.
Figure 5:
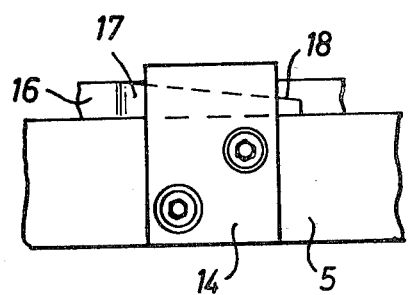

FIGS. 4 and 5 show the relative positions of the cam surfaces 15 and 18 in which they do not engage and in which they do engage respectively, and are detailed views.

The hydraulic power source to which the hydraulic cylinders 12 and 19 are connected is reversible each cylinder being a double acting cylinder and being connected to the hydraulic source through a pair of lines each of which can act as a flow or return line. An actuable hydraulic valve (not shown) is connected in series with a hydraulic cylinder 19 and when not actuated acts as a one way valve only permitting the flow of fluid in the direction to move the ring 16 to the position shown in FIGS. 1 to 3, that is to say, its non locking position. This hydraulic valve is positioned so as to be actuated by the ring 5 when it reaches the position shown in FIG. 1, that is to say when the hooks 6 are in the position to retain a flange. Upon the supply of hydraulic fluid to the cylinders 12 to move the ring 5 away from the position adjacent to the ring 9 towards the position shown in FIG. 1, the supply of fluid to the hydraulic cylinder 19 is such as to rotate the ring 16 from the position shown in FIG. 1 towards its locking position shown in FIG. 5, but no motion of the piston 21 takes place because of the hydraulic valve already been referred to but as soon as the ring 5 actuates that hydraulic valve rotation of the ring 16 takes place.

The cylinders 12 are all connected through another hydraulic valve (not shown) to the hydraulic power source this hydraulic valve again being a one way valve when not actuated and being arranged to be actuated by the ring 16 when in the position shown in FIG. 1. When the ring 16 is in its locking position and the coupling is to be opened hydraulic fluid is supplied to all the cylinders simultaneously and the fluid supplied to the cylinders 12 is in the direction to move the ring 5 towards the flange 2 but no force is exerted on the pistons 13 by the cylinders 12 because of the second hydraulic valve which has been referred to. Upon rotation of the ring 16 to the position shown the second hydraulic valve is actuated and the supply of liquid to the cylinders 12 is such as to move the ring 5 towards the flange 2.

In the utilisation envisaged for the particular embodiment of the invention illustrated the coupling may be coupled at various times to various different manifolds 4 whose flanges 3 may be of varying thicknesses. To accommodate some misalignment the ring 5 is not a tight fit on the tubular coupling 1 so as to allow some relative motion in relation thereto in order to accommodate these variations of thickness of the flange 3.

Similarly, the cam surfaces 15 and 18 need not necessarily fully engage in the locking position of the ring 16 and may have some space between them to accommodate some variations of the thicknesses of the flange 3.

Referring to FIG. 6, flange 2 is actually a plate 30 carrying a sealing ring 31 engaged by the flange 3 and may be in accordance with patent application No. 32882/76 or 2163/77. The ring plate 30 is secured to the tubular coupling member 1 and between them a further sealing ring 32 may be provided and this may be similar to the sealing ring 31.

FIG. 6 shows in outline the position of the hook 6 in the open position of the coupling.

FIG. 6 shows a coupling designed for use with a 10" manifold; FIG. 7 is a similar view of the coupling modified to make it suitable for a 12" manifold. For this purpose the inner diameter of the plate 30 is increased but the hooks 6 are not altered. However, the position of the cam pin 10 is changed being moved outwardly and is now indicated at 33, the original position of pin 10 being indicated in FIG. 7.

Similarly, FIG. 8 shows a modification of the coupling designed to make it suitable for an 8" manifold 3 and in this case the plate 30 has a smaller inner diameter and the cam pin is moved inwardly to an inner position 34 but the hooks 6 are not changed. FIG. 7 shows all three cam pin positions.

It is envisaged that the couplings shown in this application can be operated to couple it to or to uncouple it from the manifold in approximately 7 seconds and may obviously be operated by remote control. In the event of power failure the coupling can be operated by a small hand pump system and for operations underwater a hydraulic accummulator may be provided.

The plates 14 could be replaced by extension of the components which provide the pivots for the hooks 6.

I claim:

1. A coupling comprising a tubular coupling member to be coupled to a flange and having a surface against which a flange can rest, a first ring slidable externally on the tubular coupling member, a plurality of hooks pivotably carried by the ring, co-operating cam surfaces formed on or carried by the tubular coupling member and the hooks, moving means for moving the first ring away from the said surface during which motion the action of the cam surfaces is to bring the hooks into positions in which they retain a flange resting against the said surface and urge the flange against the said surface, a second ring rotatable on said tubular coupling member, cam surfaces formed on or carried by said first and second rings and rotating means for rotating said second ring for bringing said cam surfaces formed on or carried by said first and second rings into co-operation to prevent motion of said first ring towards said surface, said second ring being rotatable to bring the cam surfaces formed on or carried by the first and second rings into co-operation only when said first ring is at the distance from said surface of said tubular coupling member in which the hooks are in engagement with a flange resting against said surface of said tubular coupling member.

2. A coupling as claimed in claim 1, wherein the co-operating cam surfaces formed on or carried by the tubular coupling member and the hooks comprise rods carried by the tubular coupling member and passing through corresponding elongated slots in the hooks.

3. A coupling as claimed in claim 2, wherein each hook comprises two parallel plates carrying a hook end.

4. A coupling as claimed in any preceding claim, wherein said moving means and said rotating means are hydraulically operated.

* * * * *